INVENTOR.
Robert Bertram Ashman 3,572,283
TIRE PRESSURE INDICATOR
Robert B. Ashman, St. Louis, Mo., assignor to Scovill Manufacturing Company, Waterbury, Conn.
Filed July 15, 1969, Ser. No. 848,390
Int. Cl. B60c 23/06
U.S. Cl. 116—34
4 Claims

ABSTRACT OF THE DISCLOSURE

A cap type tire pressure indicator comprises a valving piston which when pushed up by air pressure permits air pressure to communicate to a second chamber wherein the air pressure holds up an indicating piston. When the tire pressure drops, the valving piston lowers to valve off passage to the second chamber permitting the indicating piston to drop to a visible position to indicate inadequate pressure in the tire.

---

This invention relates to a tire pressure indicator. More specifically, this invention relates to a tire pressure indicator which shows insufficient air pressure in a decisive yes-or-no way so that there can be no doubt as to the pressure condition in the tire.

The prior art is replete with tire pressure indicators of various descriptions. Some of these indicators screw onto the valve stem of the tire in place of the conventional stem cap. Such cap-type indicators have generally comprised a spring-biased piston or diaphragm which moves upward or downward in its cap-cylinder depending upon the pressure in the tire. A portion of the piston or diaphragm has been visible to indicate the pressure in the tire. In each of such prior art devices, the indicator has been of the "creeping" type in that there has been no definitive off/on indicator whereby there is indictaed either sufficient or deficient air pressure. The prior indicators have always shown the pressure as a matter of degree, hence, they have been difficult to read and therefore have left much to the judgment of the garageman who has often been too hurried to properly decide whether air was needed.

In the present device there is provided a signal means which clearly indicates underinflation or sufficient inflation as the case may be, with no creeping action such as would leave the condition in doubt.

Other objects of the invention will be clear from the following specification including drawings wherein.

Figure 1:
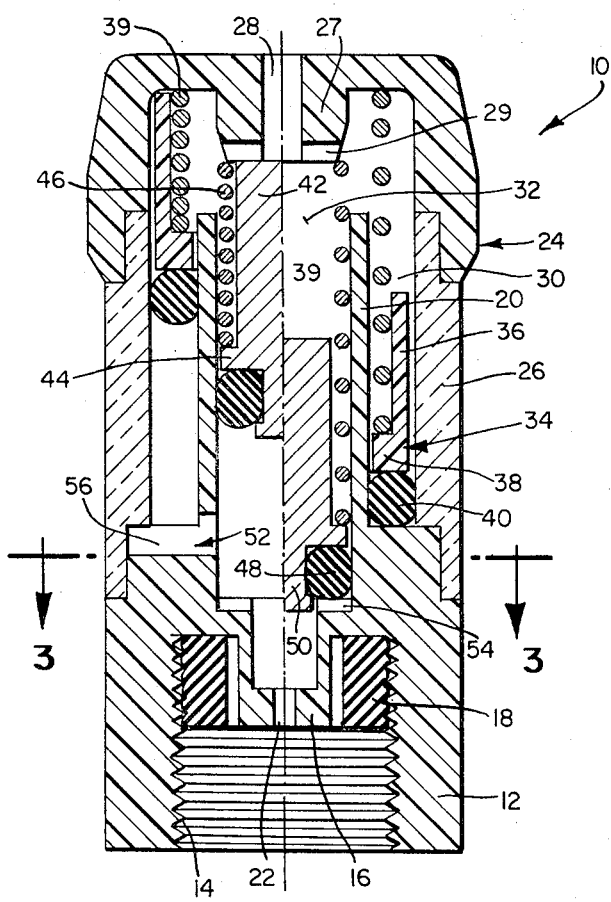
FIG. 1 is a sectional view of a cap indicator embodying the invention and shown on the left-hand side as indicating sufficient pressure, and on the right-hand side as indicating inadequate pressure.
Figure 2:
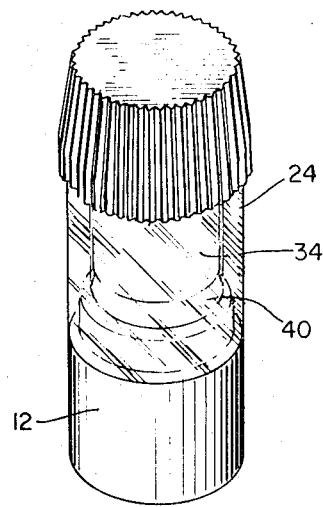
FIG. 2 is a reduced perspective view of a cap-indicator embodying the invention.
Figure 3:
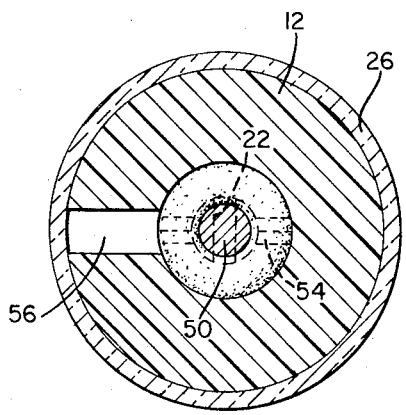
FIG. 3 is a sectional view taken on the line 3—3 of FIG. 1.

Referring more specifically to the drawings, a device embodying the invention is generally desinated 10 in FIG. 1. It comprises a base 12 having an opening 14 which may be threaded to receive in threaded engagement the upper end of a tire valve stem. Means 16 are provided in the opening 14 to depress the core pin of the valve stem so that the air pressure in the tire communicates with the indicator. A gasket 18 may also be provided. Extending upwardly from the base 12 is a tube 20 which communicates with the opening 14 through the passage means 22.

An inverted cup-shaped cover 24 has a cylindrical transparent side wall portion 26, the lower end of which is sealingly secured to the base 12 as by heat or sonic sealing or the like. The upper end of the cover carries a central downwardly extending boss 27 with a vent passage 28 and a radial vent slot 29.

By virtue of the structure described, there is defined between the tube 20 and the cover 24 an annular space 30. The interior of the tube 20 defines a cylindrical space 32.

An annular indicating piston 34 is disposed for reciprocation in the space 30. It comprises an elongated ring 36 having an inward flange 38 at its lower end. A helical spring 39 is disposed between the flange 38 and the upper end wall of the cover 24 and urges the piston 34 down. A sealing ring 40 of rubber or the like having a cross sectional diameter larger than the width of the space 30 is disposed under the piston and forms a sealing surface for the piston.

Reciprocal in the space 32 is a central valving piston 42 which has an outward flange 44. A helical spring 46 is disposed between the flange and the boss 26 and urges the central piston 42 downward. A sealing ring 48 is disposed about a lower central projection 50 of the central piston and serves as a sealing surface therefor against the inner wall of the tube 20.

A passage 52 is disposed in the wall of the tube 20 and extends between the inside and the outside of the tube at a level on the inside of the tube above the lower level of travel of the sealing surface 48, and with the outer surface of the tube at a level below the lower limit of travel of the sealing surface 40 of the annular piston.

To assure communication of air pressure to a point below the respectively sealing surfaces, radial grooves are disposed as at 54 and 56 below the sealing surfaces 48 and 40 respectively.

The operation of the cap-indicator described above is foolproof. When the indicator is screwed tightly down onto the top end of the tire stem, projection 16 depresses the core pin in the stem and air communicates through passage 22 to work against the piston 42 in opposition to the spring 46. Provided the air pressure is adequate, the piston 42 will raise, as shown on the left side of FIG. 1, opening the passage 52 and causing the piston 34 also to raise against the relatively weaker spring 39. At its upper limit of travel, the ring 34 is hidden under the opaque top of the cover 24.

When the air pressure within the tire falls, the central piston 42 will move downward at a rate depending upon the rate of pressure change. This piston 42, however, is not visible through the window 26. When the sealing surface 48 of the piston falls below the opening 52, pressure to space 30 is valved off and the space 30 below the sealing surface 40 is permitted to vent through the passage 52 and through the opening 28 to atmosphere causing the piston 34 urged by spring 39 to drop and become wholly visible through the window 26 indicating insufficient air pressure.

It should be understood that the portion of sealing surface 48 which engages against the wall of the tube 20 is wide enough to avoid the simultaneous opening of passage 52 above and below the sealing surface 48. This would, of course, permit the venting of the air pressure from the tire directly to the atmosphere.

By virtue of the present structure, there is provided an on/off type indicator which makes the decision as to whether air is needed or not in the tire and does not leave this decision up to the hurried garageman as with early indicators of the "creeping" type.

The invention set forth above may be described in the following claim language.

I claim:
1. A pressure-indicating cap for pneumatic tires comprising a base having an opening in its bottom end to engage a tire valve stem and to communicate with the inside of the tire, and a central upward tube portion having a sidewall fixed to the base and extending up about the opening so that the opening communicates with the inside of the tube portion, a cylindrical cover having a perforate top and a sidewall surrounding and spaced from the tube portion and sealed to the base, a portion of the sidewall of the cover being transparent, an annular indicating piston reciprocably disposed in the space between the tube sidewall and cover sidewall so that it can be seen at times through the window and a central piston disposed for reciprocation in the tube portion, the pistons each having sealing surfaces sealingly engaging the side walls along which they travel, spring means disposed between the top and each piston and biasing each piston toward the base, the tube portion having an opening in its side wall at a point above the level of the sealing surface of the piston in the tube portion when that piston is at its lowest point of travel and below the sealing surface of the annular piston when that piston is at its lowest point of travel.

2. A pressure indicating cap as described in claim 1 wherein the sealing surface on the central piston is at least as wide as the opening in the sidewall of the tube portion it engages.

3. A pressure indicating cap as described in claim 1 wherein said cap includes means to depress the core pin of such valve.

4. A pressure indicating cap comprising a housing adapted to communicate with and be mounted on a tire valve stem, the housing a pair of cylinders with a passage therebetween at one end, a valving piston operable in one of the cylinders, such stem communicating with the said one cylinder at the said end, the valving piston, when it is adjacent the end, closing off the passage to the other cylinder, an indicating piston operable in the second cylinder, the second cylinder having a transparent window to reveal at times the position of the indicating piston, and spring means in each cylinder urging the pistons respectively toward the said end, the spring means for the indicating piston being weaker than the spring means for the valving piston.

References Cited

UNITED STATES PATENTS

| | | | |
|---|---|---|---|
| 1,644,193 | 10/1927 | Kennedy et al. | 116—34 |
| 2,618,977 | 11/1952 | Hottenroth | 116—34UX |
| 2,903,888 | 9/1959 | Gfoll | 73—146.8 |
| 3,106,183 | 10/1963 | Schlanger | 116—34 |
| 3,260,233 | 7/1966 | Bergunder | 116—34 |

FOREIGN PATENTS

| | | | |
|---|---|---|---|
| 1,041,663 | 9/1966 | Great Britain | 116—34 |

LOUIS J. CAPOZI, Primary Examiner

U.S. Cl. X.R.

73—146.8; 116—70; 137—227; 251—324